US011792681B2

(12) United States Patent
Wu et al.

(10) Patent No.: US 11,792,681 B2
(45) Date of Patent: Oct. 17, 2023

(54) METHOD AND APPARATUS FOR INTEGRATED ACCESS AND BACKHAUL NODE SELECTION

(71) Applicant: LENOVO (BEIJING) LIMITED, Beijing (CN)

(72) Inventors: Lianhai Wu, Beijing (CN); Prateek Basu Mallick, Dreieich (DE); Joachim Lohr, Wiesbaden (DE); Hongmei Liu, Beijing (CN); Haiming Wang, Beijing (CN); Jing Han, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 256 days.

(21) Appl. No.: 17/276,127

(22) PCT Filed: Sep. 21, 2018

(86) PCT No.: PCT/CN2018/107063
§ 371 (c)(1),
(2) Date: Mar. 13, 2021

(87) PCT Pub. No.: WO2020/056749
PCT Pub. Date: Mar. 26, 2020

(65) Prior Publication Data
US 2022/0053365 A1 Feb. 17, 2022

(51) Int. Cl.
*H04W 28/02* (2009.01)
*H04W 36/22* (2009.01)
(Continued)

(52) U.S. Cl.
CPC ... *H04W 28/0289* (2013.01); *H04W 28/0862* (2023.05); *H04W 36/22* (2013.01); *H04W 88/14* (2013.01)

(58) Field of Classification Search
CPC . H04W 28/02; H04W 28/0289; H04W 28/08; H04W 28/0804; H04W 28/0808;
(Continued)

(56) References Cited

U.S. PATENT DOCUMENTS

2012/0127915 A1  5/2012  Moberg et al.
2017/0006499 A1  1/2017  Hampel et al.
(Continued)

FOREIGN PATENT DOCUMENTS

CN    103813388 A    5/2014
CN    106452703 A    2/2017
WO    2015139729 A1  9/2015

OTHER PUBLICATIONS

International Searching Authority, "Notification of Transmittal of the International Search Report and the Written Opinion of the International Searching Authority, or the Declaration", PCT/CN2018/107063, dated Sep. 21, 2018, pp. 1-6.
(Continued)

*Primary Examiner* — Robert C Scheibel
(74) *Attorney, Agent, or Firm* — Kunzler Bean & Adamson

(57) ABSTRACT

The present disclosure relates to methods and apparatuses. According to some embodiments of the disclosure, a method includes: receiving information for configuring a trigger condition that an integrated access and backhaul node reports load information of at least one integrated access and backhaul node; and reporting the load information of the at least one integrated access and backhaul node in the case that the trigger condition is met, wherein the load information includes a load status indicator of the integrated access and backhaul node.

20 Claims, 9 Drawing Sheets

(51) Int. Cl.
*H04W 88/14* (2009.01)
*H04W 28/086* (2023.01)

(58) Field of Classification Search
CPC . H04W 28/0812; H04W 88/14; H04W 40/22; H04W 36/16; H04W 36/165; H04W 36/22; H04W 28/086; H04W 28/0861; H04W 28/0862
See application file for complete search history.

(56) References Cited

U.S. PATENT DOCUMENTS

| | | | |
|---|---|---|---|
| 2019/0349118 A1* | 11/2019 | Chang | H04W 28/22 |
| 2020/0045563 A1* | 2/2020 | Luo | H04W 40/12 |
| 2021/0045037 A1* | 2/2021 | Wei | H04L 45/123 |
| 2021/0211928 A1* | 7/2021 | Narasimha | H04W 88/14 |
| 2021/0306904 A1* | 9/2021 | Narasimha | H04B 7/155 |

OTHER PUBLICATIONS

LG Electronics Inc., "Summary of [AH1807#19][IAB] IAB Flow Control and Congestion Handling", 3GPP TSG-RAN WG2 #103, R2-1812518, Aug. 20-24, 2018, pp. 1-27, Gothenburg, Sweden.

* cited by examiner

US 11,792,681 B2

METHOD AND APPARATUS FOR INTEGRATED ACCESS AND BACKHAUL NODE SELECTION

TECHNICAL FIELD

The present disclosure generally relates to wireless communication technology, especially for handling integrated access and backhaul node selection in a wireless communication system.

BACKGROUND

In the 3rd Generation Partnership Project (3GPP), deployment of Relay Nodes (hereinafter referred to as "RNs") in a wireless communication system is promoted. One of the main objectives for deploying RNs is to enhance coverage area of a Base Station (hereinafter referred to as "BS") by improving throughput of a mobile device (also known as a user equipment (UE)) that locates in a coverage hole or far from the base station, resulting in low signal quality.

In a wireless communication system employing RNs, a BS that can provide connection to at least one RN is called a Donor BS. A RN is connected to a Donor BS by a backhaul link. The RN may hop through one or more RNs before reaching the Donor BS, or may be directly connected to the Donor BS. A procedure for selecting a candidate node for a RN in the wireless communication system is desirable.

SUMMARY OF THE DISCLOSURE

An embodiment of the present disclosure provides a method, including: receiving information for configuring a trigger condition that an integrated access and backhaul node reports load information of at least one integrated access and backhaul node; and reporting the load information of the at least one integrated access and backhaul node in the case that the trigger condition is met, wherein the load information includes a load status indicator of the integrated access and backhaul node.

Another embodiment of the present disclosure provides a method, including: transmitting information for configuring a trigger condition that an integrated access and backhaul node reports load information of at least one integrated access and backhaul node; and receiving the load information of the at least one integrated access and backhaul node, wherein the load information includes a load status indicator of the integrated access and backhaul node.

Embodiment of the present disclosure also provide a non-transitory computer-readable medium. According to an embodiment of the present disclosure, the non-transitory computer-readable medium has computer-executable instructions stored therein to cause a processor to implement a method according to an embodiment of the present disclosure.

Embodiments of the present disclosure also provide an apparatus. In an embodiment of the present disclosure, an apparatus includes: a non-transitory computer-readable medium having computer-executable instructions stored therein, a receiving circuitry; a transmitting circuitry and a processor. The processor coupled to the non-transitory computer-readable medium, the receiving circuitry and the transmitting circuitry. Wherein the computer executable instructions are programmed to cause the processor to implement a method according to an embodiment of the present disclosure.

BRIEF DESCRIPTION OF THE DRAWINGS

In order to describe the manner in which advantages and features of the disclosure can be obtained, a description of the disclosure is rendered by reference to specific embodiments thereof, which are illustrated in the appended drawings. These drawings depict only example embodiments of the disclosure and are not therefore to be considered limiting of its scope.

DETAILED DESCRIPTION

The detailed description of the appended drawings is intended as a description of preferred embodiments of the present disclosure, and is not intended to represent the only form in which the present disclosure may be practiced. It should be understood that the same or equivalent functions may be accomplished by different embodiments that are intended to be encompassed within the spirit and scope of the present disclosure.

Figure 1:
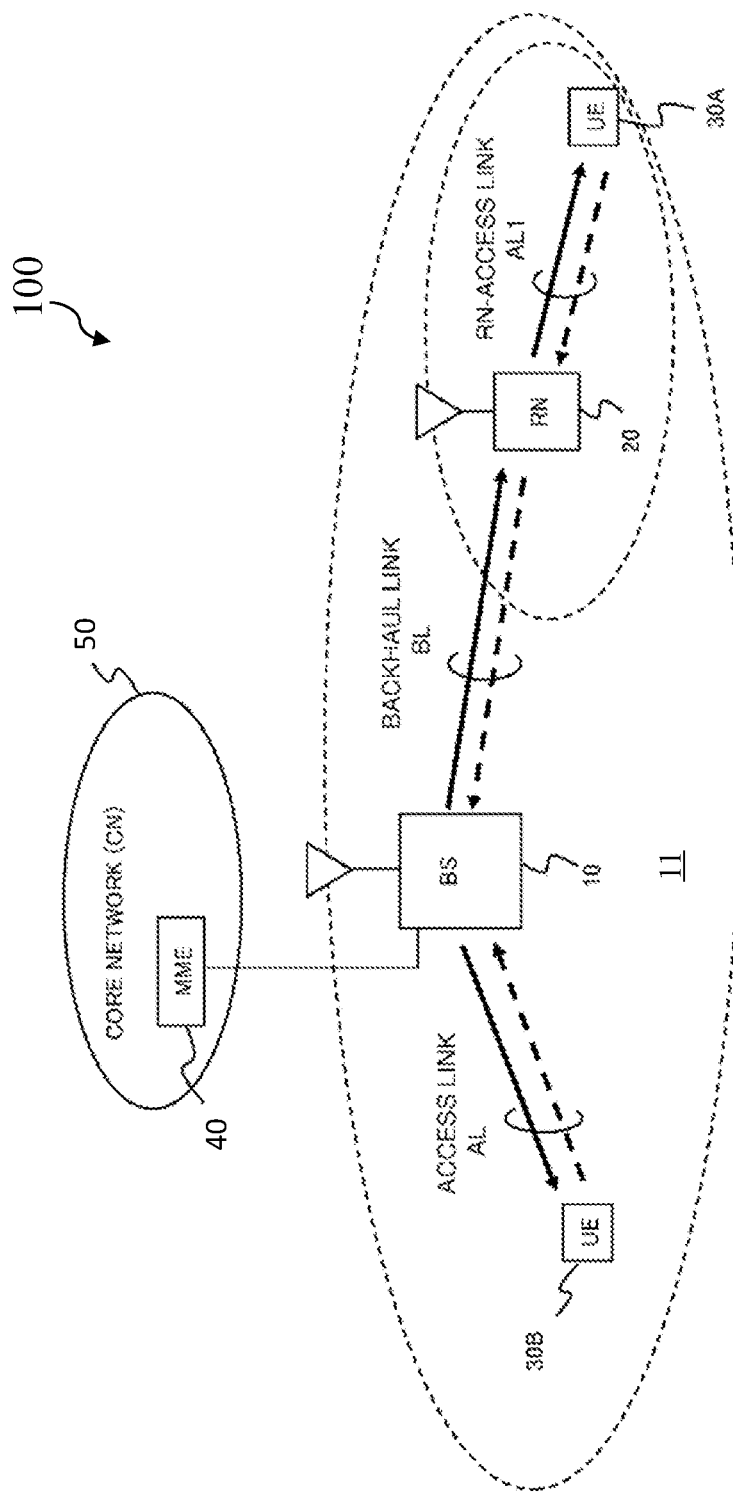
FIG. 1 illustrates a schematic wireless communication system according to an embodiment of the present disclosure.

FIG. 1 illustrates a wireless communication system 100 according to an embodiment of the present disclosure.

As shown in FIG. 1, it is assumed for simplicity that the wireless communication system 100 includes a plurality of nodes including BS 10, RN 20; and a plurality of UEs including UEs 30A and 30B. It should be noted that the wireless communication system 100 may also include of a plurality of BSs and/or a plurality of RNs.

The BS 10 operates under the control of a Mobility Management Entity (MME) 40 and is connected to a Core Network (CN) 50. The core network also includes a Home Subscriber Server (HSS) (not shown), which is in communication with the MME. The BS 10 may be based, for example, on the standards of Long-Term Evolution (LTE), LTE-Advanced (LTE-A), New Radio (NR), or other suitable standards. For example, the BS 10 may be an eNB or a gNB, and may define one or more cells, such as cell 11. UEs 30A and/or 30B may be a computing device, a wearable device, or a mobile device, etc. Persons skilled in the art should understand that as the 3GPP (3rd Generation Partnership Project) and communication technology develop, the terminologies recited in the specification may change, which should not affect the principle of the disclosure.

BS 10 provides radio protocol Layer-1 (Physical Layer) to Layer-3 (Radio Resource Control (RRC) Layer) connections to the UE 30B and the RN 20 through an Access Link (AL) and a Backhaul Link (BL), respectively. In some embodiments, the RN 20 provides radio protocol Layer-1 to Layer-3 connections to the UE 30A through a RN-access link (AL1). In other embodiments, the RN 20 provides radio protocol Layer-1 to Layer-2 connections to the UE 30A through the ALL Since RN 20 is connected to BS 10 by the backhaul link (BL), the BS 10 and the RN 20 correspond to the above-mentioned Donor BS and RN, respectively. Although FIG. 1 shows that the Donor BS 10 and the RN 20 are respectively connected to a single UE, both Donor BS 10 and RN 20 are capable of providing connections to multiple UEs.

Relaying function enables an operator to improve and extend the coverage of a BS by having RN wirelessly connected to the BS. Evolved Universal Terrestrial Radio Access Network (E-UTRAN) supports relaying by having a RN wirelessly connect to an eNB serving the RN, called Donor eNB (DeNB), via a modified version of the Evolved Universal Terrestrial Radio Access (E-UTRA) radio interface, i.e. the backhaul link (BL), also referred to as the Un interface. The radio interface that provides radio protocol connection between RN and the UE is referred to as the Uu interface. The relaying function and use of RN/DeNB entities in a network is transparent to the operations of the UEs connected.

3GPP is envisioning an Integrated Access and Backhaul (IAB) architecture for the 5G (NR) communication networks supporting multi-hop relays. That is, an IAB node may hop through one or more IAB nodes before reaching the Donor BS. Single hop should be considered a special case of multiple hops. Multi-hop backhauling is beneficial since it provides larger range extension than single-hop backhauling. Higher frequency bands, such as frequency bands above 6 GHz, have limited range of radio signals, and can profit from such larger range extension. Multi-hop backhauling further enables backhauling around obstacles, e.g., buildings in urban environments for in-clutter deployments.

The maximum number of hops in a deployment is expected to depend on a plurality of factors such as frequency, cell density, propagation environment, and traffic load. These factors are expected to change over time. As the number of hops increases, scalability issues may arise. For example, performance may degrade and/or signaling load may increase to unacceptable levels.

Figure 2:
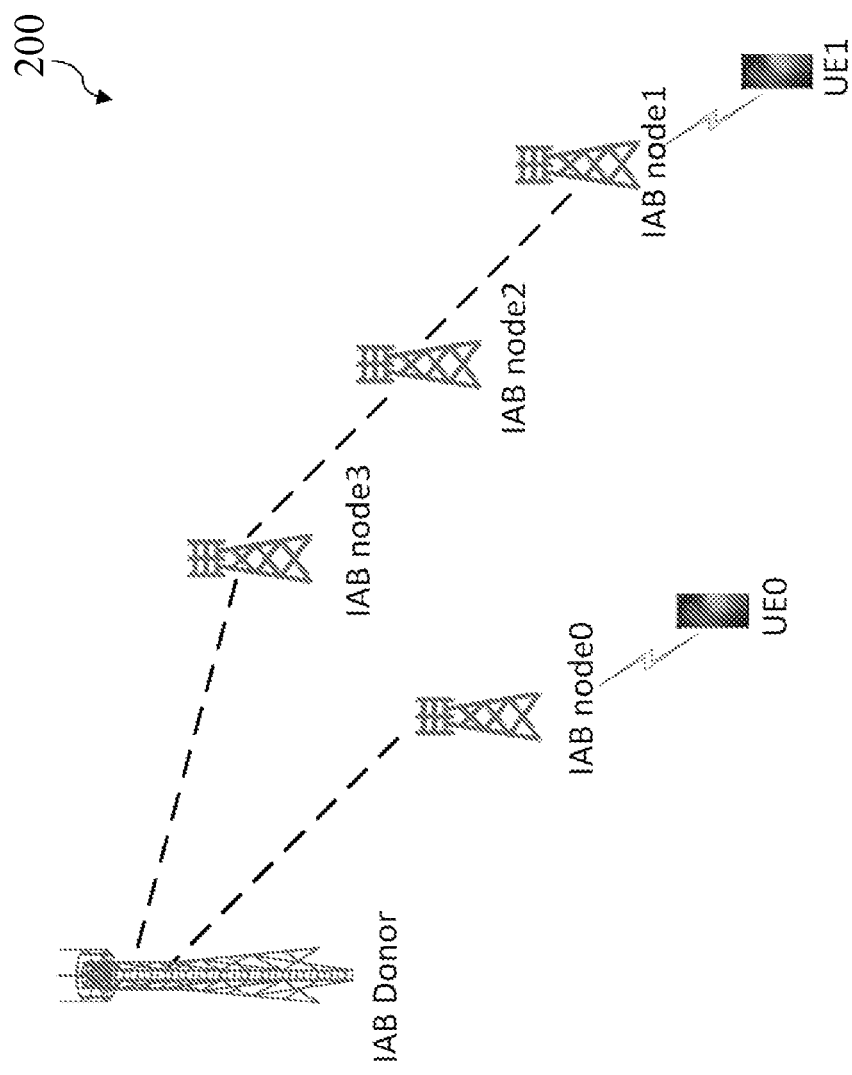
FIG. 2 illustrates a schematic wireless communication system according to an embodiment of the present disclosure.

FIG. 2 illustrates a wireless communication system 200 according to an embodiment of the present disclosure. As shown in FIG. 2, it is assumed for simplicity that the wireless communication system 200 includes a plurality of nodes, including a Donor node, i.e., IAB Donor; a plurality of IAB nodes including IAB nodes 0-3; and a plurality of access nodes including UE 0 and UE 1. It should be noted that the wireless communication system 200 may also include a plurality of Donor nodes.

In FIG. 2, it is assumed for simplicity that IAB node 0 and IAB node 3 are directly connected to the same Donor node, i.e., JAB Donor. Please note that JAB node 0 and IAB node 3 may be connected to different Donor nodes. IAB node 2 can reach JAB Donor by hopping through IAB node 3. IAB node 3 is a parent IAB node of IAB node 2. In other words, IAB node 2 is a child node of IAB node 3. JAB node 1 can reach JAB Donor by hopping through IAB node 2 and IAB node 3. JAB node 2 and IAB node 3 are upstream IAB nodes of IAB node 1, and IAB node 2 is a parent IAB node of IAB node 1. In other words, IAB node 1 is the child node of IAB node 2 and IAB node 1 and IAB node 2 are downstream IAB nodes of IAB node 3. UE 0 and UE 1 directly connect to IAB node 0 and IAB node 1, respectively. Please note that a plurality of UEs (not shown) may be directly connected to JAB nodes 0-3, respectively. In addition, a plurality of IAB nodes may be directly connected to IAB nodes 0-3.

Figure 3:
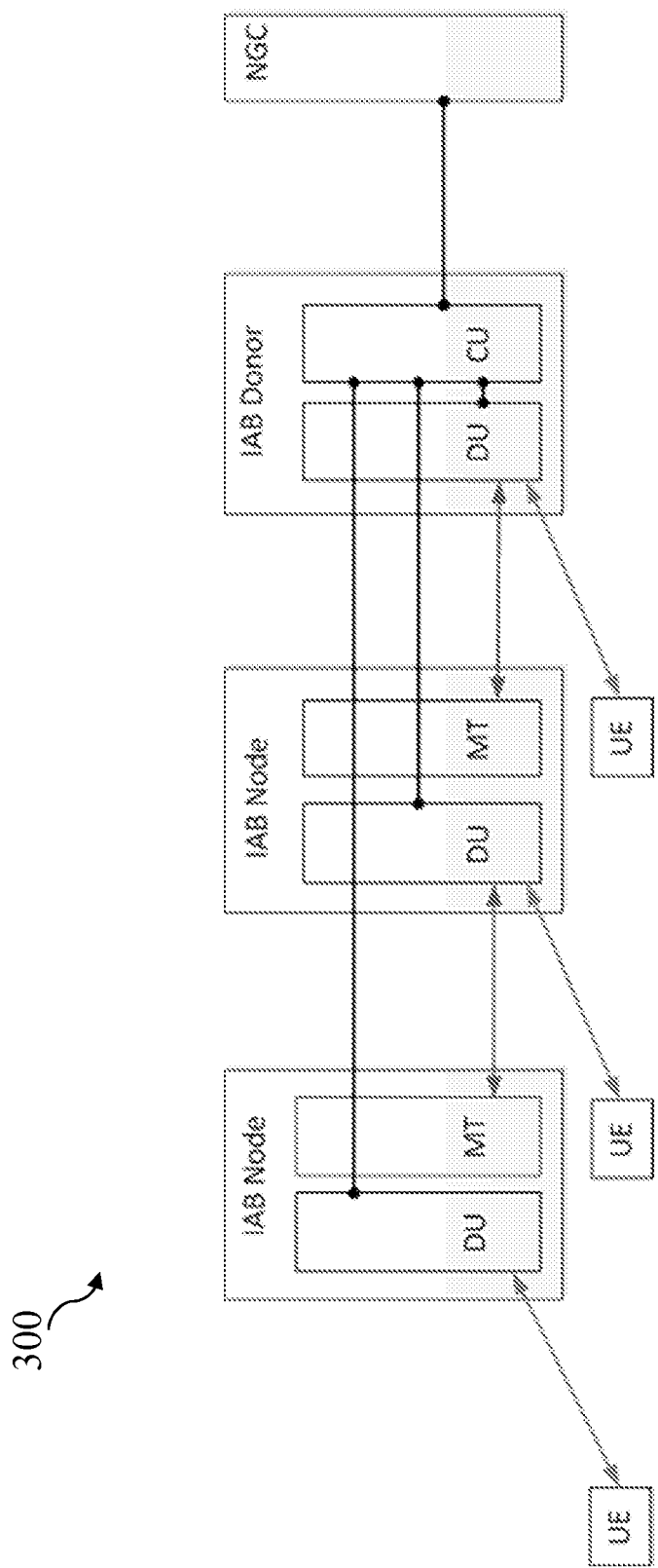
FIG. 3 illustrates a schematic wireless communication system according to an embodiment of the present disclosure.

FIG. 3 illustrates a wireless communication system 300 according to an embodiment of the present disclosure.

As shown in FIG. 3, the IAB nodes and the UEs may be connected to a Next-Generation Core (NGC). Each IAB node may include a Distributed Unit (DU) and a Mobile Termination (MT). The IAB nodes may be connected to an upstream IAB node or an JAB donor via the MT, and may be connected to the UEs and a downstream IAB node via the DU. JAB donor may include a DU to support UEs and MTs of downstream IAB nodes. JAB donor may further include a Centralized Unit (CU) for the DUs of all IAB-nodes and for its own DU. The IAB nodes in FIG. 3 may sometimes be referred to as Layer-2 (L2) IAB nodes. In some embodiments, the IAB nodes in FIG. 2, e.g., IAB nodes 0-3, may be L2 IAB nodes.

Figure 4:
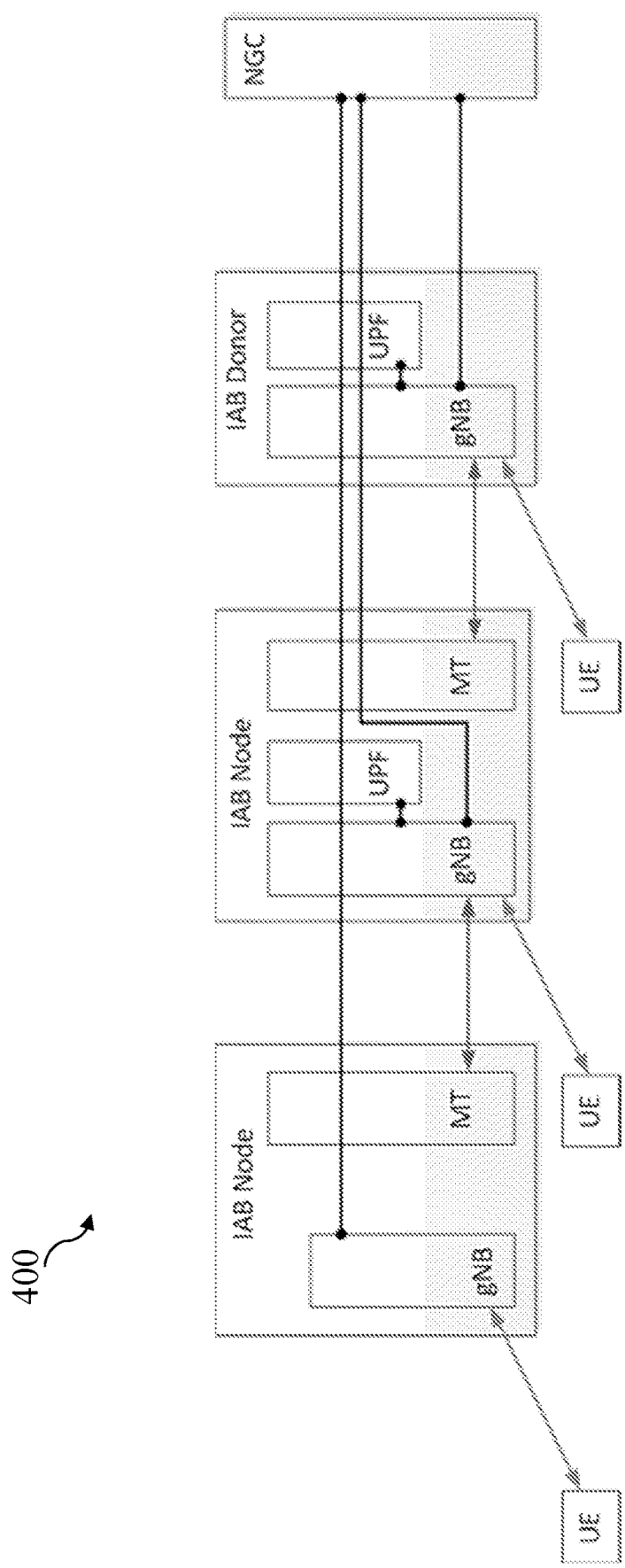
FIG. 4 illustrates a schematic wireless communication system according to an embodiment of the present disclosure.

FIG. 4 illustrates a wireless communication system 400 according to an embodiment of the present disclosure.

As shown in FIG. 4, the IAB nodes and the UEs may be connected to a NGC. Each IAB node may include a gNB and a MT. The IAB node may be connected to an upstream IAB node or an JAB donor via the MT, and may be connected to the UEs and a downstream IAB node via the gNB. The IAB node may further include a User Plane Function (UPF) that is collocated with the gNB in the IAB node. The JAB nodes in FIG. 4 may sometimes be referred to as Layer-3 (L3) IAB nodes. In some embodiments, the IAB nodes in FIG. 2, e.g., IAB nodes 0-3, may be L3 IAB nodes.

Figure 5:
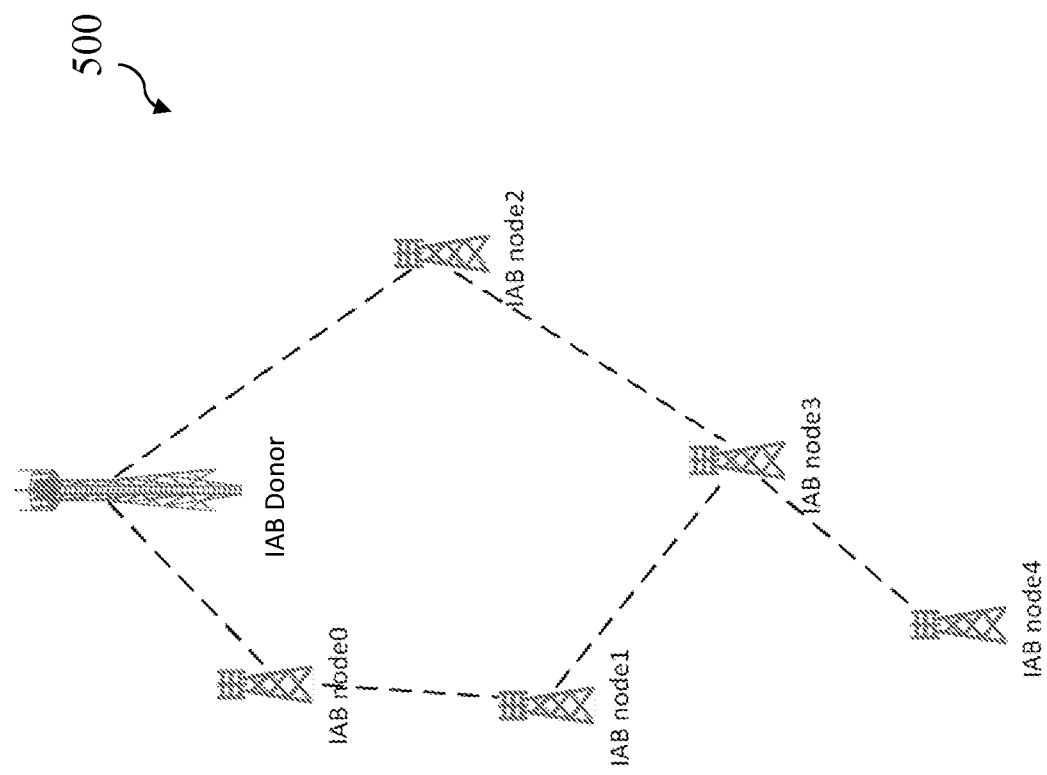
FIG. 5 illustrates a schematic wireless communication system according to an embodiment of the present disclosure.

FIG. 5 illustrates a wireless communication system 500 according to an embodiment of the present disclosure. In FIG. 5, multi-connectivity is implemented. For example, as shown in FIG. 5, IAB node 3 may be connected to more than one IAB nodes, including IAB node 1 and IAB node 2. In other words, IAB node 1 and IAB node 2 share a child IAB node, i.e., IAB node 3. In this scenario, IAB node 3 would have a plurality of routes to the Donor node, i.e., JAB Donor, via a plurality of parent IAB nodes, i.e., IAB node 1 and IAB node 2. For example, IAB node 3 can reach JAB Donor by hopping through IAB node 0 and IAB node 1. Alternatively, IAB node 3 can reach JAB Donor by hopping through IAB node 2. From the perspective of the downstream nodes of IAB node 3, e.g., IAB node 4, IAB node 4 also has a plurality of routes to JAB Donor via IAB node 3. Please note that multi-connectivity may also be implemented on one or more other IAB nodes in the wireless communication system.

Figure 6:
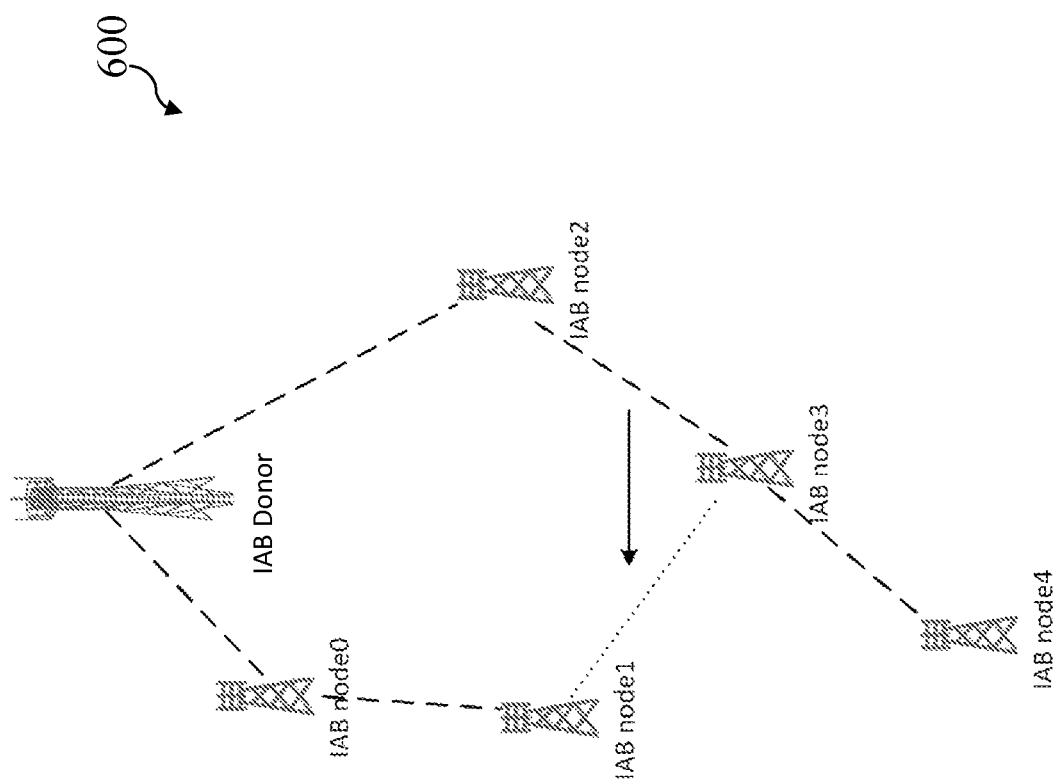
FIG. 6 illustrates a schematic wireless communication system according to an embodiment of the present disclosure.

FIG. 6 illustrates a wireless communication system 600 according to an embodiment of the present disclosure. In FIG. 6, IAB node 4 can reach the Donor node, i.e., JAB Donor, by hopping through IAB node 2 and IAB node 3, and JAB node 1 can reach JAB Donor by hopping through IAB node 0.

In a wireless communication system without IAB nodes, a Radio Link Failure (RLF) between a UE and a BS may be declared in response to at least one of the following: a RLF timer (e.g., T310) expiry, Random Access (RA) failure, or Radio Link Control (RLC) retransmission achieving the maximum number. In response to the RLF, a UE may perform a re-establishment procedure. The UE may enter into an idle mode in response to a failure in the re-establishment procedure.

In a wireless communication system employing RNs, in response to a RLF on the Un interface between a RN and a DeNB, the RN may switch to a UE mode without Un subframe limitation and perform a normal contention based Random Access Channel (RACH) procedure. For example, referring to FIG. 1, in response to a RLF between the RN 20 and the Donor BS 10, the RN 20 may switch to a UE mode and perform a normal contention based RACH procedure. In response to a successful re-establishment, a RN subframe configuration is reconfigured. In response to a failure in the re-establishment, the RN may enter into an idle mode and try to recover. Meanwhile, the RN may stop the Uu interface between the RN and the UE(s) attached to the RN by, for example, stopping Master Information Block (MIB) and/or System Information Block 1 (SIB1) transmission.

In a wireless communication system supporting multi-hop relays, the wireless backhaul links may be broken, for example, due to some reasons such as blockage by moving objects such as vehicles, foliage (caused by seasonal changes), or new buildings (caused by infrastructure changes). Physically stationary IAB nodes may suffer from this problem. For example, referring to FIG. 6, a RLF may occur on the backhaul link between IAB Donor and IAB node 2. In this example, IAB node 2 may switch to another Donor node (not shown) from IAB Donor. In another example, still referring to FIG. 6, a RLF may occur on the backhaul link between two IAB nodes, such as IAB node 3 and IAB node 2. In this example, IAB node 3 may initialize a re-establishment procedure, select a target IAB node to re-establish the backhaul link, and access to the target IAB node. For example, IAB node 3 may switch to a target IAB node, such as IAB node 1, from IAB node 2.

In addition, traffic variations may cause uneven load distribution on the wireless backhaul links, which would lead to congestion on local links or nodes. For example, referring to FIG. 6, when the traffic load on IAB node 2 is too heavy, IAB Donor may initiate a procedure to handover the child node, e.g., IAB node 3, of IAB node 2 to a target IAB node, e.g., IAB node 1.

Therefore, a procedure for selecting a target IAB node in the wireless communication system is desirable. Such procedure may be applied to handover and re-establishment procedures as described above.

In order to select a target IAB node, load information of one or more candidate IAB nodes may be provided. In addition, measurement results and other assistant information, such as hop count, may also be helpful. Therefore, a method for determining the load information of an IAB node is also desirable.

Embodiments of the present disclosure propose technical solutions for target node selection, which can at least solve the above technical problems in the new generation communication systems, such as 5G communication systems. More details on the embodiments of the present disclosure will be illustrated in the following text in combination with the appended drawings.

Figure 7:
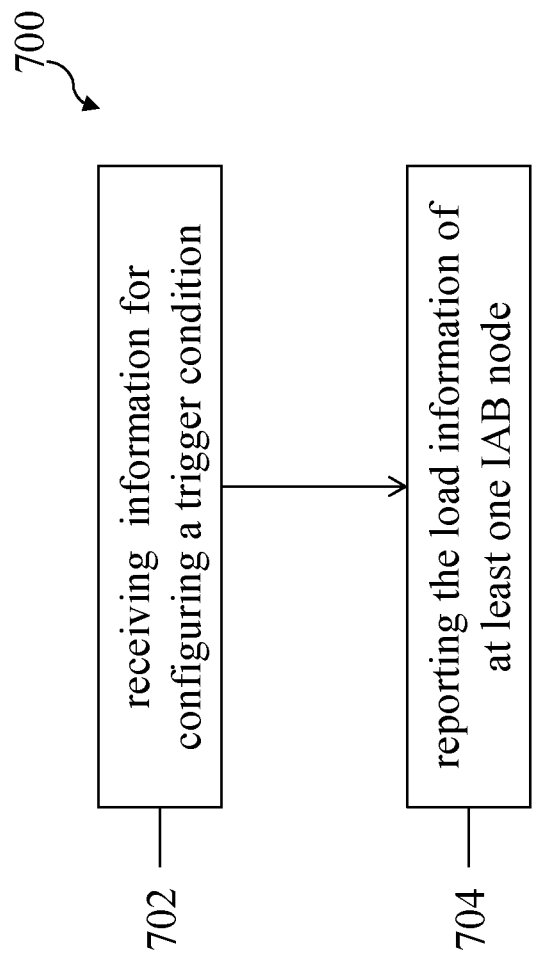
FIG. 7 illustrates an exemplary procedure for selecting a node according to an embodiment of the present disclosure.

FIG. 7 illustrates an exemplary procedure 700 for selecting a target node according to an embodiment of the present disclosure.

At step 702, an IAB node may receive information for configuring a trigger condition. If the trigger condition is met, IAB node will be triggered to report load information of at least one IAB node. In some embodiments of the present disclosure, the IAB node may be a L2 IAB node shown in FIG. 3 or a L3 IAB node shown in FIG. 4.

In some embodiments of the present disclosure, the trigger condition may be configured by a BS. For example, referring to FIG. 6, IAB node 3 may receive the trigger information via a dedicated signaling from IAB Donor.

In some embodiments of the present disclosure, the IAB node may also report is own load information. For example, referring to FIG. 6, IAB node 3 may receive information for configuring a trigger condition that IAB node 3 reports load information of at least one IAB node. The at least one IAB node may include IAB node 3.

In some embodiments of the present disclosure, the at least one IAB node may further include the candidate IAB nodes of the IAB node and upstream IAB nodes of the candidate IAB nodes. For example, referring to FIG. 6, IAB node 3 may receive information for configuring a trigger condition that IAB node 3 reports load information of at least one IAB node. IAB node 1 may be one of the candidate nodes for IAB node 3. The at least one IAB node may include IAB node 1 and its upstream IAB nodes, e.g., IAB node 0.

In some embodiments, the at least one IAB node may further include the serving IAB node of the IAB node and upstream IAB nodes of the serving IAB node. For example, referring to FIG. 6, IAB node 3 may receive information for configuring a trigger condition that IAB node 3 reports load information of at least one IAB node. The at least one IAB node may include IAB node 2 and its upstream IAB nodes, if any.

At step 704, the IAB node report the load information of the at least one JAB node in the case that the trigger condition is met. In some embodiments, the JAB node may further report measurement results and other assistant information, such as hop count.

In some embodiments, the load information of an IAB node refers to the number of access nodes of the IAB node (e.g., X). In one embodiment, the number of access nodes of the IAB node refers to the number of access nodes directly connected to the IAB node (e.g., X1). In another embodiment, the number of access nodes of the IAB node refers to the number of access nodes directly connected to the IAB node plus the number of access nodes directly connected to respective downstream IAB nodes of the IAB node (e.g., X2). In some embodiments, the access nodes may be access UEs.

In other embodiments, the load information of an IAB node refers to the number of access nodes of the IAB node X plus the number of IAB nodes of the JAB node (e.g., Y). In one embodiment, the number of access nodes of the IAB node X refers to the number of access nodes directly connected to the IAB node X1, and the number of IAB nodes of the IAB node Y is the number of child IAB nodes directly connected to the IAB node (e.g., Y1). In another embodiment, the number of access nodes of the IAB node X refers to the number of access nodes directly connected to the IAB node plus the number of access nodes directly connected to respective downstream IAB nodes of the IAB node X2, and the number of IAB nodes of the JAB node Y refers to the number of downstream IAB nodes of the IAB node (e.g., Y2). In some embodiments, the access nodes may be access UEs.

In yet other embodiments, the load information of an IAB node includes a load status indicator of the IAB node. In some embodiments, the load status indicator of the IAB node may indicate a load level of a plurality of load levels.

In one embodiment, the load status indicator may indicate a low load, a medium load, or a high load of the IAB node.

In some embodiments, the IAB node may further receive at least one threshold for load status. In one embodiment, the at least one threshold may be configured by a BS. For example, referring to FIG. 6, IAB node 3 may receive the at least one threshold via a dedicated signaling from IAB Donor. In other embodiments, the IAB node may receive a broadcast message including the at least one threshold for load status from. In one embodiment, the broadcast message is broadcasted by the parent IAB node of the IAB node. For example, referring to FIG. 6, IAB node 3 may receive the at least one threshold broadcasted by its parent IAB node, e.g., IAB node 2.

In some embodiments, the at least one threshold includes a first threshold (e.g., H1) and a second threshold (e.g., H2). In these embodiments, in the case that the number of access nodes of the IAB node X is less than the first threshold H1, the load status indicator of the IAB node indicates a low load of the IAB node. In the case that the number of access nodes of the IAB node X is equal to or greater than the first threshold H1 and is less than the second threshold H2, the load status indicator of the IAB node indicates a medium load of the IAB node. In the case that the number of access nodes of the IAB node X is equal to or greater than the second threshold H2, the load status indicator of the IAB node indicates a high load of the IAB node.

In some embodiments, the number of access nodes of the IAB node X may be X1, as described above. In other embodiments, the number of access nodes of the IAB node X is calculated based on the number of access nodes directly connected to the IAB node and the number of access nodes directly connected to respective downstream IAB nodes of the IAB node. In one embodiment, the number of access nodes of the IAB node X may be X2.

In a preferred embodiment, the IAB node and at least one neighboring IAB node may share a child IAB node. For example, referring to FIG. 5, IAB nodes 1 and 2 share a child IAB node 3. In this embodiment, the number of access nodes of the IAB node X may be calculated by:
  equally dividing the number of access nodes of the child IAB node between the IAB node and the at least one neighboring IAB node; and
  summing the divided number of access nodes with the number of access nodes directly connected to the IAB node.

For example, referring to FIG. 5, the number of access nodes of IAB node 1 may be calculated by equally dividing the number of access nodes of IAB node 3 between IAB nodes 1 and 2 and summing the divided number with the number of access nodes directly connected to IAB node 1. For example, when IAB node 1 is serving 100 UEs and its downstream IAB nodes, i.e., IAB nodes 3 and 4, are serving 50 UEs, that is, the number of UEs directly connected to IAB node 1 is 100 and the number of UEs of IAB nodes 3 is 50, the number of access nodes of IAB node 1 may be calculated by: 100+50/2=125. The number of access nodes of IAB node 2 may be similarly calculated.

In another preferred embodiment, the number of access nodes of the JAB node X may be calculated by:
  summing the number of access nodes directly connected to the IAB node with the number of access nodes of a child IAB node of the IAB node.

In this embodiment, the number of access nodes of a child IAB node of the IAB node is calculated based on the load status indicator of the child IAB node. As mentioned above, the load status indicator of an IAB node may indicate a load level of a plurality of load levels. In one example, the load status indicator may indicate a low load, a medium load, or a high load of the IAB node. In this example, in the case that the load status indicator of the child IAB node indicates a low load, the number of access nodes of the child IAB node is one-half of the first threshold H1, i.e., H1/2. In the case that the load status indicator of the child IAB node indicates a medium load, the number of access nodes of the child IAB node is an average of the first threshold H1 and second threshold H2, i.e., (H1+H2)/2. In the case that the load status indicator of the child IAB node indicates a high load, the number of access nodes of the child IAB node is one-half of the second threshold H2, i.e., H2/2. In other examples, the number of access nodes of the child IAB node may be similarly calculated.

For example, referring to FIG. 5, when the load status indicator of IAB node 3 indicates a low load, and the first threshold H1 is "50," the number of access nodes of IAB node 3 is 50/2=25. When IAB node 1 is serving 100 UEs, that is, the number of UEs directly connected to IAB node 1 is 100, the number of access nodes of IAB node 1 may be calculated by: 100+25=125. The number of access nodes of IAB node 2 may be similarly calculated.

In other embodiments, the at least one threshold includes a first threshold (e.g., H1), a second threshold (e.g., H2), a third threshold (e.g., H3), and a fourth threshold (e.g., H4).

In these embodiments, in the case that the number of access nodes of the JAB node X is less than the first threshold H1 and the number of IAB nodes of the JAB node Y is less than the third threshold H3, the load status indicator indicates a low load of the IAB node. In the case that the number of access nodes of the IAB node X is equal to or greater than the second threshold H2 and the number of IAB nodes of the IAB node Y is equal to or greater than the fourth threshold H4, the load status indicator indicates a high load of the IAB node. Otherwise, the load status indicator indicates a medium load of the IAB node.

In some embodiment, the number of access nodes of the IAB node X is X1, as described above, and the number of IAB nodes of the IAB node Y is Y1, as described above. In other embodiments, the number of access nodes of the JAB node X is calculated based on the number of access nodes directly connected to the IAB node and the number of access nodes directly connected to respective downstream IAB nodes of the IAB node, and the number of IAB nodes of the JAB node Y is calculated based on the number of downstream IAB nodes of the IAB node Y2. In one embodiment, the number of access nodes of the IAB node X may be X2, as described above, and the number of IAB nodes of the IAB node Y is Y2, as described above.

In a preferred embodiment, the IAB node and at least one neighboring JAB node may share a child IAB node. For example, referring to FIG. 5, IAB nodes 1 and 2 share a child IAB node 3. In this embodiment, the number of access nodes of the IAB node X may be calculated by:
  equally dividing the number of access nodes of the child IAB node between the IAB node and the at least one neighboring IAB node; and
  summing the divided number of access nodes with the number of access nodes directly connected to the IAB node.

For example, referring to FIG. 5, the number of access nodes of IAB node 1 may be calculated by equally dividing the number of access nodes of IAB node 3 between IAB node 1 and IAB node 2 and summing the divided number with the number of access nodes directly connected to IAB node 1. For example, when JAB node 1 is serving 100 UEs and its downstream IAB nodes, i.e., IAB node 3 and JAB node 4, are serving 50 UEs, that is, the number of UEs directly connected to JAB node 1 is 100 and the number of UEs of IAB node 3 is 50, the number of access nodes of IAB node 1 may be calculated by: 100+50/2=125. The number of access nodes of IAB node 2 may be similarly calculated.

In this embodiment, the number of downstream IAB nodes of the IAB node may be similarly calculated as described above with respect to the number of access nodes of the IAB node X. For example, referring to FIG. 5, when the number of child IAB nodes of IAB node 1 is 3, i.e., IAB node 3 and IAB nodes 31 and 32 (not shown), the number of downstream IAB nodes of IAB node 3 is M, the numbers of downstream IAB nodes of IAB node 31 and IAB node 32 are N, respectively, and the numbers of parent IAB nodes of IAB node 31 and IAB node 32 are 1, respectively, the number of downstream IAB nodes of IAB node 1 may be calculated by: K+P/2+M/2+N+N, wherein K+P=the number of child IAB nodes of IAB node 1, P refers to the child node shared between IAB node 1 and IAB node 2, i.e., IAB node 3, and K refers to the remaining child IAB nodes of IAB node 1, i.e., IAB node 31 and JAB node 32. In the above example, K=2 and P=1. When the number of downstream IAB nodes of IAB node 3 is 2, i.e., IAB node 4 and IAB node 5 (not shown), and the numbers of downstream IAB nodes of IAB node 31 and IAB node 32 are 1, respectively, that is, M=2 and N=1, the number of downstream IAB nodes of JAB node 1 may be calculated by: 2+1/2+2/2+1+1=5.5. The number of downstream IAB nodes of IAB node 2 may be similarly calculated. Alternatively, the number of IAB nodes of the IAB node Y may be the number of downstream JAB nodes of the IAB node Y2.

In another preferred embodiment, the number of access nodes of the JAB node X may be calculated by:

summing the number of access nodes directly connected to the IAB node with the number of access nodes of a child IAB node of the IAB node.

In this embodiment, the number of access nodes of a child IAB node of the IAB node is calculated based on the load status indicator of the child IAB node. As mentioned above, the load status indicator of an IAB node may indicate a load level of a plurality of load levels. In one example, the load status indicator may indicate a low load, a medium load, or a high load of the IAB node. In this example, in the case that the load status indicator of the child IAB node indicates a low load, the number of access nodes of the child IAB node is one-half of the first threshold H1, i.e., H1/2. In the case that the load status indicator of the child IAB node indicates a medium load, the number of access nodes of the child IAB node is an average of the first threshold H1 and second threshold H2, i.e., (H1+H2)/2. In the case that the load status indicator of the child IAB node indicates a high load, the number of access nodes of the child IAB node is one-half of the second threshold H2, i.e., H2/2. In other examples, the number of access nodes of the child IAB node may be similarly calculated.

For example, referring to FIG. 5, when the load status indicator of IAB node 3 indicates a low load, and the first threshold H1 is "50," the number of access nodes of IAB node 3 is 50/2=25. When IAB node 1 is serving 100 UEs, that is, the number of UEs directly connected to IAB node 1 is 100, the number of access nodes of IAB node 1 may be calculated by: 100+25=125. The number of access nodes of IAB node 2 may be similarly calculated.

In this embodiment, the number of downstream IAB nodes of the IAB node may be similarly calculated as described above with respect to the number of access nodes of the IAB node X. For example, referring to FIG. 5, when the number of child IAB nodes of IAB node 1 is 1, i.e., IAB node 3, the load status indicator of IAB node 3 indicates a low load, and the third threshold H3 is "2," the number of downstream IAB nodes of IAB node 3 is 2/2=1, and the number of access nodes of IAB node 1 may be calculated by: 1+2/2=2. Alternatively, the number of IAB nodes of the IAB node Y may be the number of downstream IAB nodes of the IAB node Y2.

In some embodiments, the information for configuring the trigger condition may include a step size. The step size being equal to or greater than 1. In these embodiments, the trigger condition may be a change in the number of access nodes of the IAB node being equal to or greater than the step size. The number of access nodes of the IAB node may be determined as described above.

For example, the step size may be one. In this example, when the number of access nodes of the IAB node changes, the IAB node may report the load information of the at least one IAB node. In another example, the step size may be more than one. In this example, when the change in the number of access nodes of the IAB node is equal to or greater than the step size, the IAB node may report the load information of the at least one IAB node.

In other embodiments, the trigger information includes an indication for a change in the load status indicator. In these embodiments, the trigger condition may be a change in the load status indicator. The load status indicator of the IAB node may be determined as described above. For example, referring to FIG. 6, when the load status indicator of IAB node 3 changes, e.g., from indicating a low load to indicating a medium load, IAB node 3 may report the load information of the at least one IAB node.

In some embodiments, the IAB node may broadcast load information of the IAB node. In one embodiment, the load information of the IAB node includes the load status indicator of the IAB node. For example, referring to FIG. 6, IAB node 3 may broadcast its load information. The load information of IAB node 3 may include a load status indicator of IAB node 3.

In some embodiments, the IAB node may further broadcast load information of upstream IAB nodes of the IAB node. In one embodiment, the load information of the upstream IAB nodes includes respective load status indicators of the upstream IAB nodes.

In some embodiments, the respective load status indicators of the upstream IAB nodes of the IAB node are broadcasted by a parent IAB node of the IAB node.

For example, referring to FIG. 6, IAB node 3 may further broadcast the load information of its upstream IAB nodes, e.g., IAB node 2. The load information of IAB node 2 may include a load status indicator of IAB node 2. The load information of the upstream IAB nodes of IAB node 3 is broadcasted by the parent IAB node of IAB node 3, i.e., IAB node 2.

In some embodiments, the procedure in FIG. 7 as described above may occur during a handover procedure. In one embodiment, a BS may select a node from the candidate IAB nodes as the target IAB node for handover, and may transmit a handover command to the IAB node. The selection may be based on the load information of the candidate IAB nodes. The selection may be further based on measurement results and/or other assistant information, such as hop count. Upon receiving the handover command, the IAB node may switch from the serving IAB node to the target IAB node.

For example, referring to FIG. 6, IAB Donor may select a node, e.g., IAB node 1, as the target IAB node, and transmit a command to handover IAB node 3 from IAB node 2 to IAB node 1.

In other embodiments, the procedure in FIG. 7 as described above may occur during a re-establishment procedure. For example, referring to FIG. 6, a RLF may occur on the backhaul link between IAB node 3 and IAB node 2. IAB node 3 may initiate a re-establishment procedure, select a candidate IAB node to re-establish the backhaul link, and access to the selected IAB node, e.g., IAB node 1. The selection may be based on the load information of the candidate IAB nodes. The selection may be further based on measurement results and/or other assistant information, such as hop count.

For example, referring to FIG. 6, IAB node 3 may select a candidate node, e.g., IAB node 1, to re-establish the backhaul link, and switch to the selected candidate IAB node, e.g., IAB node 1, from IAB node 2.

Figure 8:
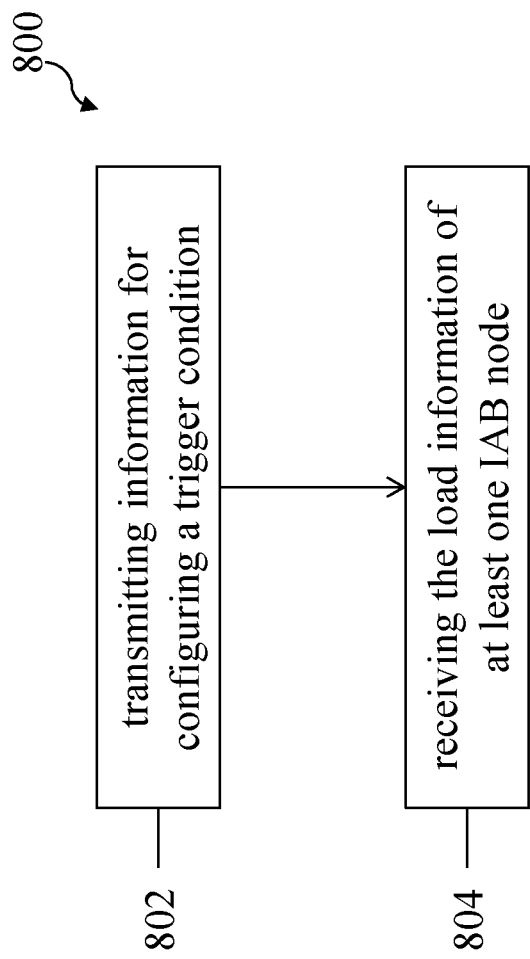
FIG. 8 illustrates an exemplary procedure for selecting a node according to an embodiment of the present disclosure.

FIG. 8 illustrates an exemplary procedure 800 for selecting a target node according to an embodiment of the present disclosure.

At step 802, a BS may transmit information for configuring a trigger condition. The IAB node can be triggered to report load information of at least one IAB node, once the trigger condition is met. In some embodiments of the present disclosure, the BS may be an IAB donor shown in FIG. 3.

At step 804, the BS may receive the load information of the at least one IAB node. In some embodiments of the present disclosure, the load information includes a load status indicator of the IAB node. The load information, e.g., the load status indicator, may be determined according to the exemplary procedure as described above with respect to FIG. 7.

In some embodiments of the present disclosure, the trigger information includes a step size. The step size being equal to or greater than 1. In other embodiments of the present disclosure, the trigger information includes an indication for a change in the load status indicator. An IAB node may determine when the trigger condition is met according to the exemplary procedure as described above with respect to FIG. 7.

In some embodiments of the present disclosure, the load status indicator of the IAB node may indicate a load level of a plurality of load levels of the IAB node. In one embodiment, the load status indicator indicates a low load, a medium load, or a high load of the IAB node.

In some embodiments of the present disclosure, the BS may further transmit at least one threshold for load status. In some embodiments, the load information, e.g., the load status indicator, is based on the at least one threshold.

In some embodiments of the present disclosure, the BS may further transmit a handover command to one of the at least one IAB node based on the received load information. The handover procedure may be performed according to the exemplary procedure as described above with respect to FIG. 7.

Figure 9:
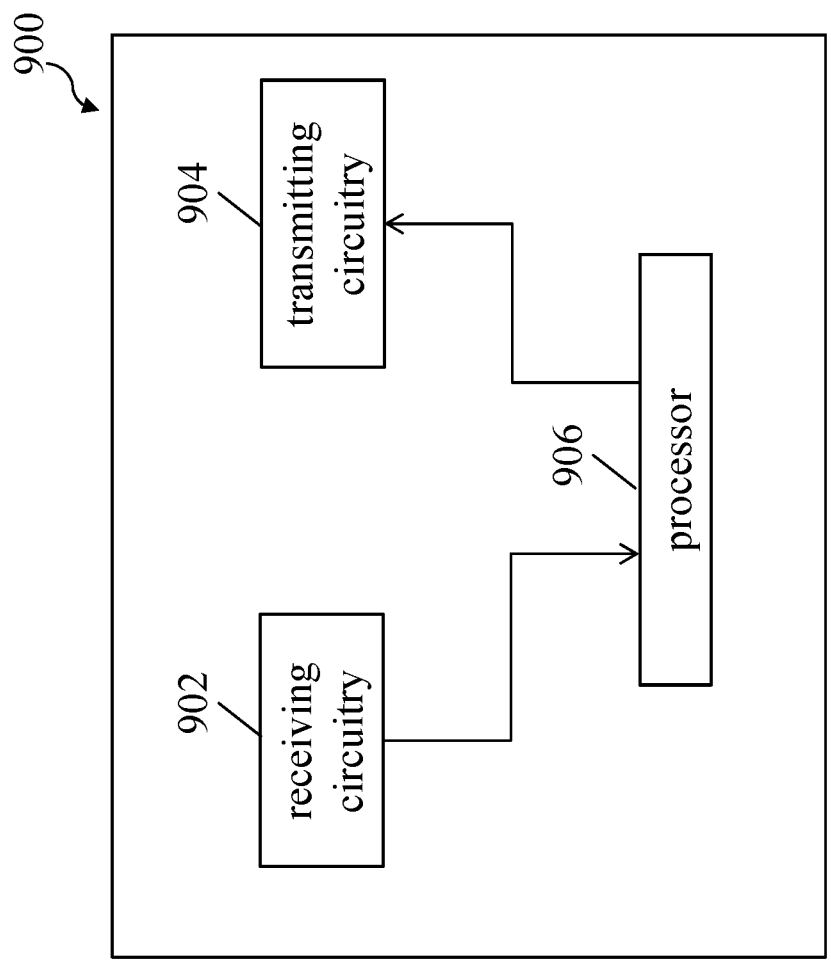
FIG. 9 illustrates an example block diagram of an apparatus according to an embodiment of the present disclosure.

FIG. 9 illustrates a block diagram of an apparatus 900 according to an embodiment of the present disclosure.

As shown in FIG. 9, the apparatus 900 may include a non-transitory computer-readable medium (not shown), a receiving circuitry 902, a transmitting circuitry 904, and a processor 906 coupled to the non-transitory computer-readable medium, the receiving circuitry and the transmitting circuitry. The apparatus 900 may be a BS or an IAB node. Although in this figure, elements such as processor, transmitting circuitry, and receiving circuitry are described in the singular, the plural is contemplated unless limitation to the singular is explicitly stated. In some embodiments, the receiving circuitry 902 and the transmitting circuitry 904 are combined into a single device, such as a transceiver. In certain embodiments, the apparatus 900 may further include an input device, a memory, and/or other components.

In some embodiments, the non-transitory computer-readable medium may have stored thereon computer-executable instructions to cause a processor to implement the method with respect to the IAB node as described above. For example, the computer-executable instructions, when executed, cause the processor 906 interacting with receiving circuitry 902 and transmitting circuitry 904, so as to perform the steps with respect to the IAB node depicted in FIG. 7.

In other embodiments, the non-transitory computer-readable medium may have stored thereon computer-executable instructions to cause a processor to implement the method with respect to the base station as described above. For example, the computer-executable instructions, when executed, cause the processor 906 interacting with receiving circuitry 902 and transmitting circuitry 904, so as to perform the steps with respect to the BS depicted in FIG. 8.

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including."

The following is what is claimed:

1. A method comprising:
   receiving a plurality of thresholds associated with a load status;

receiving information for configuring a trigger condition associated with reporting an integrated access and backhaul (IAB) load information of at least one IAB node; and reporting the IAB load information of the at least one IAB node in response to the trigger condition being met, wherein the IAB load information includes a load status indicator of the IAB node and the IAB load information comprises a load level based at least partly on the plurality of thresholds and a number of access nodes of the IAB node.

2. The method of claim 1, wherein:
the at least one IAB node includes the IAB node; or
the at least one IAB node includes a candidate parent IAB node of the IAB node and upstream IAB nodes of the candidate parent IAB node.

3. The method of claim 1, wherein:
the trigger condition includes a step size, the step size being equal to or greater than 1; and
the trigger condition is a change in the number of access nodes of the IAB node being equal to or greater than the step size.

4. The method of claim 1, wherein:
the trigger condition includes an indication for a change in the load status indicator; and
the trigger condition is the change in the load status indicator.

5. The method of claim 1, further comprising
receiving at least one threshold for load status;
receiving a broadcast message including at least one threshold for load status; or
a combination thereof.

6. The method of claim 5, wherein the at least one threshold includes a first threshold and a second threshold, and wherein:
if the number of access nodes of the IAB node is less than the first threshold, the load status indicator indicates a low load of the IAB node;
if the number of access nodes of the IAB node is equal to or greater than the first threshold and is less than the second threshold, the load status indicator indicates a medium load of the IAB node; and
if the number of access nodes of the IAB node is equal to or greater than the second threshold, the load status indicator indicates a high load of the IAB node.

7. The method of claim 6, wherein:
the number of access nodes is the number of access nodes directly connected to the IAB node;
the number of access nodes is calculated based on the number of access nodes directly connected to the IAB node and the number of access nodes directly connected to respective downstream IAB nodes of the IAB node; or
a combination thereof.

8. The method of claim 6, wherein the number of access nodes is calculated based on the number of access nodes directly connected to the IAB node and the number of access nodes directly connected to respective downstream IAB nodes of the IAB node, wherein the IAB node and at least one neighboring IAB node share a child IAB node, the number of access nodes is calculated by:
equally dividing the number of access nodes of the child IAB node between the IAB node and the at least one neighboring IAB node, and
summing the divided number of access nodes with the number of access nodes directly connected to the IAB node.

9. The method of claim 6, wherein the number of access nodes is calculated based on the number of access nodes directly connected to the IAB node and the number of access nodes directly connected to respective downstream IAB nodes of the IAB node, wherein the number of access nodes is calculated by summing the number of access nodes directly connected to the IAB node with the number of access nodes of a child IAB node of the IAB node, and wherein:
if a load status indicator of the child IAB node indicates a low load, the number of access nodes of the child IAB node is one-half of the first threshold;
if a load status indicator of the child IAB node indicates a medium load, the number of access nodes of the child IAB node is an average of the first and second thresholds; and
if a load status indicator of the child IAB node indicates a high load, the number of access nodes of the child IAB node is one-half of the second threshold.

10. The method of claim 5, wherein the at least one threshold includes a first threshold, a second threshold, a third threshold, and a fourth threshold; and
wherein:
if the number of access nodes of the IAB node is less than the first threshold and the number of IAB nodes of the IAB node is less than the third threshold, the load status indicator indicates a low load of the IAB node;
if the number of access nodes of the IAB node is equal to or greater than the second threshold and the number of IAB nodes of the IAB node is equal to or greater than the fourth threshold, the load status indicator indicates a high load of the IAB node;
otherwise, the load status indicator indicates a medium load of the IAB node.

11. The method of claim 10, wherein:
the number of access nodes is the number of access nodes directly connected to the IAB node, and
the number of IAB nodes is the number of child IAB nodes directly connected to the IAB node.

12. The method of claim 10, wherein:
the number of access nodes is calculated based on the number of access nodes directly connected to the IAB node and the number of access nodes directly connected to respective downstream IAB nodes of the IAB node, and
the number of IAB nodes is calculated based on the number of downstream IAB nodes of the IAB node.

13. The method of claim 12, wherein the IAB node and at least one neighboring IAB node share a child IAB node, the number of access nodes is calculated by:
equally dividing the number of access nodes of the child IAB node between the IAB node and the at least one neighboring IAB node, and
summing the divided number of access nodes with the number of access nodes directly connected to the IAB node.

14. The method of claim 12, wherein the number of access nodes is calculated by summing the number of access nodes directly connected to the IAB node with the number of access nodes of a child IAB node of the IAB node, and wherein:
if a load status indicator of the child IAB node indicates a low load, the number of access nodes of the child IAB node is one-half of the first threshold;

if a load status indicator of the child IAB node indicates a medium load, the number of access nodes of the child IAB node is an average of the first and second thresholds; and if a load status indicator of the child IAB node indicates a high load, the number of access nodes of the child IAB node is one-half of the second threshold.

15. The method of claim 1, further comprising:
broadcasting the IAB load information, wherein the IAB load information includes the load status indicator of the IAB node.

16. The method of claim 15, wherein broadcasting the IAB load information further comprises:
broadcasting upstream IAB load information of upstream IAB nodes of the IAB node, wherein the upstream IAB load information of the upstream IAB nodes includes respective load status indicators of the upstream IAB nodes, wherein the respective load status indicators are broadcasted by a parent IAB node of the IAB node.

17. A method comprising:
transmitting a plurality of thresholds associated with a load status;
transmitting information for configuring a trigger condition associated with reporting an integrated access and backhaul (IAB) load information of at least one IAB node; and
receiving the IAB load information of the at least one IAB node in response to the trigger condition being met, wherein the IAB load information includes a load status indicator of the IAB node and the IAB load information comprises a load level based at least partly on the plurality of thresholds and a number of access nodes of the IAB node.

18. The method of claim 17, wherein:
the trigger condition includes a step size, the step size being equal to or greater than 1;
the trigger condition includes an indication for a change in the load status indicator; or
a combination thereof.

19. The method of claim 17, wherein the load status indicators indicate at least one of the following: a low load, a medium load, and a high load.

20. The method of claim 17, further comprising:
transmitting at least one threshold for load status, wherein the load status indicator is based on the at least one threshold;
transmitting a handover command to one of the at least one IAB node based on the received IAB load information; or
a combination thereof.

* * * * *